United States Patent Office 3,330,814
Patented July 11, 1967

3,330,814
HYDROXYL-CONTAINING COPOLYMERS
Joseph A. Vasta, Sharon Hill, Pa., assignor to E. I. du Pont de Nemours and Company, Wilmington, Del., a corporation of Delaware
No Drawing. Filed May 1, 1964, Ser. No. 364,285
16 Claims. (Cl. 260—88.1)

This application is a continuation-in-part of application Ser. No. 283,589, filed May 27, 1963, and Ser. No. 313,759, filed Oct. 4, 1963, both now abandoned.

This invention relates to thermosetting vinyl addition polymers. It is more particularly directed to vinyl addition polymers bearing pendant hydroxyl groups, and to coating compositions formulated with these polymers.

The polymers of this invention are made from monoethylenically unsaturated monomers. The polymers have acid numbers up to about 40 and contain at least 5%, by weight of the total polymer, of monoethylenically unsaturated carboxylic acid monomer units having active hydrogen atoms esterified with either a

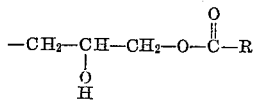

or

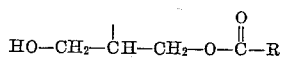

group
wherein R is a tertiary aliphatic hydrocarbon group of the structure

where $R_1$ is —$CH_3$ and $R_2$ and $R_3$ are alkyl groups of 1 through 12 carbon atoms.

Illustrative of the monoethylenically unsaturated monomers which can be used to prepare the polymers are styrene, vinyl toluene, methacrylate esters, acrylate esters, acrylonitrile, acrylic acid, methacrylic acid, itaconic acid, and maleic acid. The monomers must of course be copolymerizable.

UTILITY

The polymers are useful in preparing thermosetting coating compositions especially suited for finishing appliances such as refrigerators, washing machines, ranges and the like. These finishes show excellent alkali and detergent resistance, resistance to tobacco, grease and chemical fumes, and resistance to food and drug stains. They also show superior heat resistance. The finishes are harder than those used heretofore, which increases their mar and abrasion resistance. Coating compositions using these polymers can be cured at conventional baking temperatures without sacrificing these advantageous properties.

Preferred for this use because of their low cost and durability and the availability of the monomers are polymers made from styrene and acrylic acid monomers, the polymers having acid numbers of about 5 through 40 and at least about 5%, by weight, of acid monomers units having active hydrogen atoms esterified with a

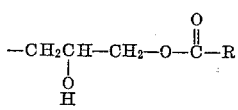

or

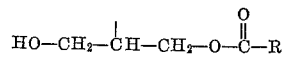

group.

Especially preferred are polymers made from about 30–77% styrene, and 20–69% acrylic acid esterified as above, the polymers having acid numbers of 8 through 25.

Most preferred is a polymer made from about 60–61% styrene and 37–38% esterified acrylic acid, having an acid number of from 10 through 20.

PREPARATION

The polymers of this invention can be prepared by two methods, both of which involve attaching a glycidyl ester moiety containing pendant hydroxyl groups to a "backbone" polymer.

In the first method, a backbone polymer having free carboxyl groups is first prepared. The glycidyl ester moiety is then attached directly to this backbone by reacting it with a glycidyl ester of a carboxylic acid. This ester has the formula

where R is a tertiary group of the structure

where $R_1$ is —$CH_3$ and $R_2$ and $R_3$ are alkyl groups of 1 through 12 carbon atoms.

Especially preferred because of the acid and alkali resistance of the product obtained is a mixed glycidyl ester manufactured and sold by the Shell Chemical Co. as "Cardura" E ester, which is a glycidyl ester of a synthetic tertiary carboxylic acid having the general formula

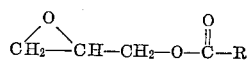

where R is a tertiary aliphatic hydrocarbon group of 8 through 10 carbon atoms.

In the second method, the preparation of the backbone polymer and its esterification with the glycidyl ester are carried on simultaneously in the same reaction vessel.

In either case, the backbone polymer is formed by copolymerizing suitable monoethylenically unsaturated monomers. The selection of monomers used in preparing these backbone copolymers will, of course, be determined by the physical properties desired of the final product and the type of coating composition to be made from it. For example, if coating compositions for interior use are to be made, where optimum durability is unnecessary, the backbone copolymer can be composed principally of styrene units. On the other hand, if it is desired to make compositions suitable for exterior use, where high durability is needed, the backbone copolymer can be composed mainly of methylmethacrylate units.

Needless to say, properties can be balanced by varying the number and kind of monomers used. The physical nature of the final polymers can also be varied by manipulating reaction conditions and catalysts. All this is well known in the polymer art and can be done by anyone versed in polymer chemistry.

*Method 1.*—Polymerization of the monomers to form a polymeric backbone can be carried out by simply admixing suitable monomers, in proportions selected to impart the desired physical properties to the product, dissolved in such inert solvents as xylene, toluene, methyl ethyl ketone or butyl alcohol.

A polymerization catalyst is then added to this mixture. Suitable for use are such catalysts as tertiary butyl peroxide, cumene hydroperoxide, and azobisbutyronitrile. The catalyst should be present in the reaction mixture at a concentration of 0.1% to 2%, by weight of the monomers present.

This mixture is then refluxed until polymerization is complete, which can be determined by a polymer solids determination.

To this reaction mixture is then added enough of the glycidyl ester to give the product the desired acid number. From 0.05–3%, by weight of the polymer, of an esterification catalyst can be used, if desired, to decrease reaction time and to obtain consistently high yields.

Suitable as esterification catalysts are such quaternary bases or salts as benzyltrimethylammonium hydroxide, benzyltrimethylammonium chloride, octadecyltrimethylammonium chloride, or such amines as triethylamine and triethanolamine.

This mixture is then refluxed until the desired acid number is obtained. The solid impurities are filtered off, giving a clear solution of a polymer of the invention.

This solution is suitable for direct use in the preparation of coating compositions. If the pure polymer is desired, it can be obtained by simply stripping the solvent from the solution, leaving behind a solid mass whose physical properties can range from resinous to crystalline, depending on the monomers and conditions used.

*Method 2.*—The same solvents and polymerization catalysts can be used as in method 1, and in the same proportions. For maximum yield, the esterification catalyst should be a quaternary base or salt.

The monomer or monomers, solvent, polymerization catalyst, glycidyl ester, and esterification catalyst are admixed in the same proportions as in method 1. This mixture is then refluxed until an acid number of less than 40 is obtained. The solid impurities are then filtered off, giving a solution of a polymer of the invention, similarly suitable for direct use in coating compositions.

PREPARATION OF COATING COMPOSITIONS

Coating compositions can be prepared using the polymers of this invention by blending them with such solvents as high solvency hydrocarbons, or with alcohols, esters, ketones or ethers, and, if desired, with pigments and such modifying agents as plasticizers and fillers. This blending is accomplished by such customary procedures as sand-grinding or ball-milling the polymer and a solvent to form a mill-base, with which the other components are then blended.

Thermosetting coating compositions especially suited for use as appliance enamels and the like can be made by using from 10–60%, by weight of the film-forming components of an aminoplast coating resin which can be a condensate of formaldehyde with melamine, urea benzoguanamine or melaminetoluenesulfonamide, in conjunction with the polymers of the invention. The addition of the aminoplast resins imparts improved hardness and solvent, alkali and heat resistance to the resulting finishes. These resins can be prepared according to directions in U.S. Patents 2,197,357; 2,508,875 and 2,191,957.

Compositions which give chemically inert coatings can be made by using from 5–50%, by weight of the film-forming components, of a phenol-formaldehyde resin with the polymers of the invention.

To coating compositions containing either an aminoplast condensate or a phenol-formaldehyde resin, one can add from 5–30%, by weight of the film-forming components, of an epoxy polyether condensate having a plurality of vic-epoxy moieties. These condensates preferably contain at least one aliphatic hydroxyl moiety per molecule. Addition of such a resin to these coating compositions improves their metal adhesion, their flexibility and their corrosion resistance. These resins can be prepared according to directions in U.S. Patents 2,503,726; 2,582,985; 2,592,560 and 2,694,694.

The aminoplast resins, phenol-formaldehyde resins and epoxy-polyether condensates can be added to the coating compositions by simple blending techniques.

The compositions can be applied by handspray or electrostatic spray techniques, or by dip or flow coating. They are then baked at from 250° F. to 400° F. for from 30 to 120 minutes.

The invention is more specifically illustrated by the following examples:

Example 1

| First portion: | Parts by wt. |
|---|---|
| Industrial xylol—10° | 156.4 |
| High solvency petroleum naphtha | 156.2 |
| "Cardura" E | 117.5 |
| Second portion: | |
| Styrene | 239.1 |
| Acrylic acid | 41.9 |
| Di-tertiary butyl peroxide | 4.0 |
| Benzyltrimethylammonium hydroxide—40% solution in methanol | 2.0 |
| Third portion: | |
| Butanol | 79.9 |

The first portion is charged into a reactor and heated to reflux temperature.

The ingredients of the second portion are mixed and then added to the reactor over a two-hour period. This solution is then held at reflux temperature for three hours.

Heat is withdrawn and the solution is cooled and thinned with the third portion to give a copolymer solution containing 50% solids, and having a Gardner Holt viscosity of T.

The resulting polymer is the copolymerization and esterification product of the following reactants in the listed proportions:

| | Percent |
|---|---|
| Styrene | 60 |
| "Cardura" E | 29 |
| Acrylic acid | 11 |
| | 100 |

It has an acid number of about 15.

Example 2

| First portion: | Parts by wt. |
|---|---|
| Methylmethacrylate | 31.96 |
| Methacrylic acid | 2.64 |
| "Cardura" E | 5.80 |
| Benzoyl peroxide (75% active paste) | 0.30 |
| Benzyltrimethylammonium hydroxide—40% solution in methanol | 1.00 |
| Toluene—industrial grade | 23.60 |
| Acetone | 23.60 |
| Second portion: | |
| Acetone | 11.10 |

The ingredients of the first portion are mixed and charged into a reactor. This solution is then heated at reflux temperature for about 10–16 hours until a solution containing 38–40% solids is obtained.

The heat is then withdrawn, the solution cooled and thinned with the second portion to give a copolymer solution having 40% solids.

The resulting polymer is the copolymerization and esterification product of the following reactants, in the listed proportions:

| | Percent |
|---|---|
| Methylmethacrylate | 79.1 |
| Methacrylic acid | 6.5 |
| "Cardura" E | 14.4 |
| | 100.0 |

It has an acid number of about 9.1.

Example 3

First portion: Parts by wt.
    Industrial xylol—10° _____ 390.4
Second portion:
    Styrene _____ 100.0
    Ethyl acrylate _____ 205.0
    Methacrylic acid _____ 57.5
    Tertiary butyl peracetate 75% solution in benzene _____ 7.0
Third portion:
    "Cardura" E _____ 137.5
    Benzyltrimethylammonium hydroxide 40% solution in methanol _____ 5.0

The first portion is charged into a reactor and heated to reflux temperature. The components of the second portion are then mixed and added to the reactor, at reflux temperature, over a three-hour period.

This reaction mixture, after addition of the second portion is complete, is held at reflux temperature for an additional three hours until the viscosity of the resulting solution remains constant.

The third portion is then charged into the reactor and the entire mixture held at reflux temperature until the acid number is less than 11.

This solution is then cooled and filtered to give a clear solution having a total solids content of about 50% and a Gardner Holt viscosity of H.

The resulting polymer is the copolymerization and esterification product of the following reactants, in the listed proportions:

|  | Percent |
|---|---|
| Styrene | 20.0 |
| Ethyl acrylate | 41.0 |
| Methacrylic acid | 11.5 |
| "Cardura" E | 27.5 |
|  | 100.0 |

It has an acid number of about 11.

Example 4

First portion: Parts by wt.
    Industrial xylol _____ 156.4
    High solvency petroleum naphtha _____ 156.2
    "Cardura" E _____ 117.5
Second portion:
    Vinyl toluene _____ 179.3
    Ethyl acrylate _____ 59.8
    Acrylic acid _____ 41.9
    Cumene hydroperoxide _____ 4.0
Third portion:
    Butanol _____ 81.9

The first portion is charged into a reactor and heated to reflux temperature.

The components of the second portion are then mixed and charged into the reactor over a two-hour period. This solution is then held at reflux temperature for three hours, after which the heat is withdrawn and the solution cooled and thinned with the third portion.

This gives a copolymer solution having a total solids content of about 50%.

The resulting polymer is the copolymerization and esterification product of the following reactants, in the listed proportions:

|  | Percent |
|---|---|
| Vinyl toluene | 45 |
| Ethyl acrylate | 15 |
| "Cardura" E | 29 |
| Acrylic acid | 11 |
|  | 100 |

It has an acid number of about 18.

Example 5

First portion: Parts by wt.
    Industrial xylol _____ 39.40
    Butanol _____ 9.85
Second portion:
    Methylmethacrylate _____ 12.50
    Ethyl acrylate _____ 12.50
    Methacrylic acid _____ 6.40
    t-Butyl peracetate 75% solution in benzene _ 0.35
Third portion:
    "Cardura" E _____ 18.60
    Benzyltrimethylammonium hydroxide 40% solution in methanol _____ 0.40

The first portion is charged into a reactor and heated to reflux temperature.

The components of the second portion are then mixed and added to the reactor over a three-hour period. This solution is then held at reflux temperature for an additional three hours.

At the end of three hours, the third portion is added and the solution again held at reflux temperature until the acid number is about 5. This gives a copolymer solution having a total solids content of about 50%.

The resulting polymer is the copolymerization and esterification product of the following reactants, in the listed proportions:

|  | Percent |
|---|---|
| Methylmethacrylate | 25.0 |
| Ethyl acrylate | 25.0 |
| Methacrylic acid | 12.8 |
| "Cardura" E | 37.2 |
|  | 100.0 |

It has an acid number of about 5.

Example 6

First portion: Parts by wt.
    Industrial xylol _____ 38.70
    Butanol _____ 9.68
    "Cardura" E _____ 14.88
Second portion:
    Styrene _____ 15.00
    Methylmethacrylate _____ 7.50
    Acrylonitrile _____ 7.50
    Methacrylic acid _____ 5.12
    t-Butyl peracetate 75% solution in benzene _____ 0.67
    Benzyltrimethylammonium hydroxide 40% solution in methanol _____ 0.62
Third portion:
    Butanol _____ 0.33

The first portion is charged into a reactor and heated to reflux temperature.

The components of the second portion are then mixed and added to the reactor over a three-hour period. After the addition of portion two is completed, the solution is held at reflux temperature for three hours, after which the heat is withdrawn and the mixture cooled and thinned with the third portion.

The resulting polymer is the copolymerization and esterification product of the following reactants in the listed proportions:

|  | Percent |
|---|---|
| Styrene | 30.00 |
| Methylmethacrylate | 15.00 |
| Acrylonitrile | 15.00 |
| "Cardura" E | 29.76 |
| Methacrylic acid | 10.24 |
|  | 100.00 |

It has an acid number of about 0.

Example 7

| First portion: | Parts by wt. |
|---|---|
| Monomethyl ether of ethylene glycol | 19.8 |
| Industrial xylol | 79.2 |
| Second portion: | |
| Itaconic acid | 8.26 |
| Methylmethacrylate | 30.00 |
| Ethyl acrylate | 30.00 |
| "Cardura" E | 31.74 |
| Benzyltrimethylammonium hydroxide solution in methanol | 0.5 |
| t-Butyl peracetate 75% solution in benzene | 0.5 |

The first portion is charged into a reactor and heated to reflux temperature.

The components of the second portion are mixed and then added to the reactor over a one-hour period. This solution is then held at reflux temperature for three hours, after which heat is withdrawn and the resin cooled and filtered.

The resulting polymer is the copolymerization and esterification product of the following reactants, in the listed proportions:

| | Percent |
|---|---|
| Methylmethacrylate | 30.00 |
| Ethyl acrylate | 30.00 |
| "Cardura" E | 31.74 |
| Itaconic acid | 8.26 |
| | 100.00 |

It has an acid number of about 0.

Example 8

| First portion: | Parts by wt. |
|---|---|
| Butanol | 58.8 |
| 2-ethyl hexyl acrylate | 50.0 |
| Maleic anhydride | 11.6 |
| Cumene hydroperoxide | 0.5 |
| Second portion: | |
| "Cardura" E | 30.6 |
| Triethylamine | 1.0 |
| Third portion: | |
| Xylol | 47.5 |

The first portion is charged into a reactor and heated to reflux temperature for 5–6 hours.

The ingredients of the second portion are then charged into the reactor. This solution is refluxed until an acid number of about 5 is obtained.

The resulting polymer is the copolymerization and esterification product of the following reactants, in the listed proportions:

| | Percent |
|---|---|
| 2-ethyl hexyl acrylate | 50.0 |
| Maleic anhydride | 11.6 |
| Butanol (esterified) | 8.8 |
| "Cardura" E | 29.6 |
| | 100.0 |

It has an acid number of about 5.

Example 9

| First portion: | Parts by wt. |
|---|---|
| Hydrocarbon 150 (High solvency petroleum naphtha 95% aromatic content) | 1040 |
| Butanol | 150 |
| Benzyl trimethyl ammonium hydroxide | 7 |
| "Cardura" E | 113 |
| Second portion: | |
| Styrene | 750 |
| Butyl methacrylate | 555 |
| Methacrylic acid | 82 |
| Ditertiary butyl peroxide | 30 |

The first portion is charged to a reactor over a four-hour period and heated to reflux temperature.

The ingredients of the second portion are added and the mass is held at reflux temperature for three hours.

Heat is withdrawn and the solution is cooled to give a copolymer solution containing 55% solids and having a Gardner Holt viscosity of Z.

The resulting polymer is the copolymerization and esterification product of the following reactants, in the listed proportions:

| | Percent |
|---|---|
| Styrene | 50.15 |
| Butyl methacrylate | 36.80 |
| "Cardura" E | 7.55 |
| Methacrylic acid | 5.50 |
| | 100.00 |

It has an acid number of about 19.

In the foregoing examples, the polymers can be isolated by stripping off the solvent.

Example 10

| First portion—Pigment dispersion: | Parts by wt. |
|---|---|
| Example 1 copolymer solution 50% polymer content | 87.45 |
| Industrial xylol—10° | 65.59 |
| Titanium dioxide pigment—rutile | 284.21 |
| Second portion: | |
| Example 1 copolymer solution 50% polymer content | 291.50 |
| Melamine-formaldehyde resin solution 55% in butanol | 227.60 |
| Third portion: | |
| Industrial xylol—10° | 43.65 |

Portion one is sand ground. The second and third portions are then blended into this mill base.

The resulting composition is reduced with 20–25%, by volume, of industrial xylol and sprayed on a refrigerator suitably primed with an industrial primer. The resulting finish is baked for 30 minutes at 325° F. to give a finish having a Knoop hardness of 25–30.

Example 11

| First portion—Pigment dispersion: | Parts by wt. |
|---|---|
| Example 2 copolymer solution 40% polymer content | 125.00 |
| Industrial xylene | 125.00 |
| Titanium dioxide pigment—rutile | 133.33 |
| Second portion: | |
| Benzyl butyl phthalate | 66.67 |
| Example 2 copolymer solution 40% polymer content | 375.00 |
| Ethylene glycol monomethyl ether acetate (methyl Cellosolve acetate) | 175.00 |

The first and second portions are processed as in Example 1. The resulting composition is reduced with an equal volume of industrial xylol and sprayed to an automobile over a conventional industrial primer. The finish is baked for 30 minutes at 250° F. to give a hard, durable finish.

Example 12

| First portion—Pigment dispersion: | Parts by wt. |
|---|---|
| Example 6 copolymer solution 50% polymer content | 87.45 |
| High solvency petroleum naphtha | 65.59 |
| Titanium dioxide pigment—rutile | 284.21 |
| Second portion: | |
| Example 6 copolymer solution 50% polymer content | 291.50 |
| Urea-formaldehyde resin 60% solution in butanol | 208.63 |
| Third portion: | |
| Butanol | 22.62 |
| High solvency naphtha | 40.00 |

The first portion is sand ground to a 0.5 mil fineness. The second portion is then stirred into this mill base, and the third portion is then added.

The resulting composition is reduced 25-30% by volume with industrial xylol and then sprayed directly to an electric roaster primed with a conventional industrial primer. The resulting finish is baked 30 minutes at 300° F. to give a hard, tough chemical resistant film having excellent adhesion properties.

*Example 13*

| First portion: | Parts by wt. |
|---|---|
| Example 1 copolymer solution 50% polymer content | 87.7 |
| Industrial xylol | 65.8 |
| Titanium dioxide pigment—rutile | 285.0 |
| Second portion: | |
| Example 1 copolymer solution 50% polymer content | 282.8 |
| Hexamethoxymethyl melamine—100% | 57.0 |
| Epon 1001 [1]—50% solids in a 50/50 high solvency petroleum naphtha/butanol solution | 85.5 |
| Third portion: | |
| High solvency petroleum naphtha | 65.1 |
| Butanol | 65.1 |
| 20% solution of p-toluenesulfonic acid in butanol | 9.0 |

The first portion is sand ground to a 0.5 mil fineness. The second portion is then stirred into this mill base, and the third portion is then added.

The resulting composition is an excellent one-coat appliance enamel.

It is first thinned with xylol to hand-spray application viscosity. It is then applied directly to suitably primed metal and baked for 30 minutes at 325° F. to give a stable, flexible, stain-resistant finish.

The embodiments of the invention in which an exclusive property or privilege is claimed are defined as follows:

1. A polymer of monoethylenically unsaturated monomers, said polymer having an acid number up to about 40 and containing at least 5%, by weight of the total polymer, of ethylenically unsaturated carboxylic acid monomer units having active hydrogen atoms replaced with a structure selected from the group consisting of

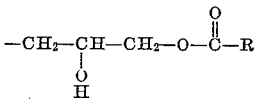

and

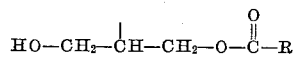

wherein R is a tertiary aliphatic hydrocarbon radical having the structure

where $R_1$ is —$CH_3$ and $R_2$ and $R_3$ are alkyl groups of 1 through 12 carbon atoms.

2. A polymer of monoethylenically unsaturated monomers, said polymer having an acid number up to about 40 and containing at least 5%, by weight of the total polymer, of ethylenically unsaturated carboxylic acid monomer units having active hydrogen atoms replaced with a structure selected from the group consisting of

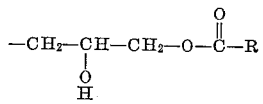

and

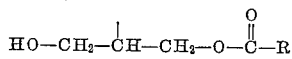

wherein R is a tertiary aliphatic hydrocarbon group of 8 through 10 carbon atoms.

3. A polymer according to claim 1 wherein the monoethylenically unsaturated monomers are styrene and acrylic acid, said polymer having an acid number of from 5 through 40.

4. A polymer according to claim 1, said polymer comprising from 30 through 77% styrene units and from 20 through 69% esterified acrylic acid units, said polymer having an acid number of 8 through 25.

5. A polymer according to claim 1, said polymer comprising 60-61% styrene units and 37-38% esterified acrylic acid units, said polymer having an acid number of 10 through 20.

6. A polymer according to claim 2 wherein the monoethylenically unsaturated monomers are styrene and acrylic acid, said polymer having an acid number of from 5 through 40.

7. A polymer according to claim 2, said polymer comprising from 30 through 77% styrene units and from 20 through 69% esterified acrylic acid units, said polymer having an acid number of 8 through 25.

8. A polymer according to claim 2, said polymer comprising 60-61% styrene units and 37-38% esterified acrylic acid units, said polymer having an acid number of 10 through 20.

9. A coating composition comprising at least one polymer according to claim 3 and a liquid carrier therefor.

10. A coating composition comprising at least one polymer according to claim 4 and a liquid carrier therefor.

11. A coating composition comprising at least one polymer according to claim 5 and a liquid carrier therefor.

12. A coating composition comprising at least one polymer according to claim 6 and a liquid carrier therefor.

13. A coating composition comprising at least one polymer according to claim 7 and a liquid carrier therefor.

14. A coating composition comprising at least one polymer according to claim 8 and a liquid carrier therefor.

15. A coating composition comprising at least one polymer according to claim 1 and a liquid carrier therefor.

16. A coating composition comprising at least one polymer according to claim 2 and a liquid carrier therefor.

References Cited

UNITED STATES PATENTS

| 2,819,237 | 1/1958 | Daniel | 260—844 |
| 2,957,853 | 10/1960 | Chapin et al. | 260—844 |
| 2,966,479 | 12/1960 | Fischer | 260—78.4 |
| 3,002,959 | 10/1961 | Hicks | 260—88.1 |

FOREIGN PATENTS

| 1,269,628 | 7/1961 | France. |

MURRAY TILLMAN, *Primary Examiner.*

J. C. BLEUTGE, *Assistant Examiner.*

---

[1] A condensate made by reacting epichlorohydrin and diphenylolpropane under alkaline conditions. It has a melting point of about 70° C., an epoxy equivalent weight of 450 to 525 and an esterification equivalent weight of about 145. The product is made and sold by the Shell Chemical Company.